United States Patent
Kisielius et al.

(10) Patent No.: US 9,529,803 B2
(45) Date of Patent: Dec. 27, 2016

(54) IMAGE MODIFICATION

(71) Applicant: Google Inc., Mountain View, CA (US)

(72) Inventors: Andrew Vytas Kisielius, San Francisco, CA (US); Wenfeng Li, Sunnyvale, CA (US); Michael Paul Rolig, San Francisco, CA (US); Chunfeng Hao, Santa Clara, CA (US); Jacqueline Anne Lai, Irvine, CA (US); Alena Viktorovna Repina, Novosibirskaya Oblast (RU); Bryan M. Klingner, Austin, TX (US); Robert William Christy, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 261 days.

(21) Appl. No.: 14/331,928

(22) Filed: Jul. 15, 2014

(65) Prior Publication Data

US 2016/0019223 A1    Jan. 21, 2016

(51) Int. Cl.
| | |
|---|---|
| *G06F 3/048* | (2013.01) |
| *G06F 17/30* | (2006.01) |
| *G06F 3/0484* | (2013.01) |
| *G06T 11/60* | (2006.01) |

(52) U.S. Cl.
CPC ..... *G06F 17/30061* (2013.01); *G06F 3/04845* (2013.01); *G06T 11/60* (2013.01)

(58) Field of Classification Search
CPC ................. G06F 17/30; G06F 3/0484
See application file for complete search history.

(56) References Cited

U.S. PATENT DOCUMENTS

| | | | |
|---|---|---|---|
| 2003/0122806 A1* | 7/2003 | Edge | H04N 1/6011 345/204 |
| 2006/0125938 A1 | 6/2006 | Ben-Ezra et al. | |
| 2007/0110338 A1* | 5/2007 | Snavely | G06F 17/30274 382/305 |
| 2013/0156331 A1 | 6/2013 | Kurabayashi et al. | |
| 2013/0194375 A1 | 8/2013 | Michrowski et al. | |
| 2014/0078172 A1 | 3/2014 | Systrom et al. | |

OTHER PUBLICATIONS

International Search Report and Written Opinion for PCT Application No. PCT/US2015/039727, dated Oct. 13, 2015.

(Continued)

*Primary Examiner* — Peiyong Weng
(74) *Attorney, Agent, or Firm* — Lerner, David, Littenberg, Krumholz & Mentlik, LLP

(57) ABSTRACT

In one aspect, a request to alter a first image is received. The request includes a portion of the first image that is provided for display with a second image. The second image is associated with three-dimensional (3D) geometry data for an object depicted in both the first and second images and date information identifying when the second image was captured. Input identifying an area of the second image is received. A third image is identified based on the date information of the third image and the second image. The third image is associated with 3D geometry data for the object. An area of the third image is determined based on the 3D geometry data of the second image, the 3D geometry data of the second image, and the area of the second image. Information identifying the area of the third image is provided for display with the third image.

16 Claims, 10 Drawing Sheets

(56) References Cited

OTHER PUBLICATIONS

Seitz, Steven M. and Kiriakos N. Kutulakos. "Plenoptic Image Editing." International Journal of Computer Vision 48(2) (Jul. 1, 2002): pp. 115-129.
"Method and system for creation of digital album based on location and time axis." IP.com Journal, IP.com Inc. (Jul. 5, 2013): pp. 1-2.
Anguelov, Dragomir et al. "Google Street View: Capturing the World at Street Level." Computer, IEEE 43(6) (Jun. 1, 2010): pp. 32-38.
"Privacy and Security about Google Maps", Downloaded from: <http://www.google.com/maps/about/behind-the-scenes/streetview/privacy/#streetview>, on May 9, 2014, 4 pages.
Breen, Christopher, "Blurring objects you want to hide in iMovie '11", May 13, 2013. 2 pages.
Jennings, Daniel, "How to hide your house from Google Maps", Off the Grid News, Oct. 30, 2013, <http://www.offthegridnews.com/2013/10/30/how-to-hide-your-house-from-google-maps/>, 10 pages.
MichaelZimer.org, "Google to Blur Personal Data on Street View Upon Request—But Requesting Remains Difficult", <http://www.michaelzimmer.org/2007/08/23/google-to-blur-personal-data-on-street-view-upon-request-but-requesting-remains-difficult>, 2014, 4 pages.
TechSmith, "Maintain privacy with the Blur Annotation", Downloaded from: <http://www.techsmith.com/tutorial-camtasia-mac-blur.html>, on May 9, 2014, 4 pages.
Wikipedia, "Google Street View Privacy concerns", Downloaded from: <http://en.wikipedia.org/wiki/Google_Street_View_privacy_concerns>, on May 9, 2014, 11 pages.

\* cited by examiner

IMAGE MODIFICATION

BACKGROUND

Various systems may provide users with images of different locations. Some systems provide users with panoramic images. For example, panoramic images may include an image or collection of images having a field of view which is greater than that of the human eye, e.g., 180 degrees or greater. Some panoramas may provide a 360-degree view of a location.

In some examples, these systems may provide users with the ability to request that certain of the images be blurred or otherwise distorted as appropriate. Such requests may then be subject to review by operators and manual application of such blurring.

SUMMARY

Aspects of the disclosure provide a computer-implemented method. The method includes receiving, by one or more computing devices, a request to alter a first image. The request identifies at least a portion of the first image. The method also includes providing for display, by the one or more computing devices, the portion of the first image and a second image. The second image is associated with three dimensional geometry data corresponding to a surface of an object depicted in both the first image and the second image and with date information identifying when the second image was captured. The method includes receiving, by the one or more computing devices, input identifying an area of the second image and identifying, by the one or more computing devices, a third image based on date information identifying when the third image was captured and the date information identifying when the second image was captured. The third image is associated with three dimensional geometry data corresponding to a surface of the object depicted in the third image. The method also includes determining, by the one or more computing devices, an area of the third image based on the three dimensional geometry data associated with the third image, the three dimensional geometry data associated with the second image, and the area of the second image, and the method includes providing, by the one or more computing devices, information identifying the area of the third image for display with the third image.

In one example, the method also includes providing for display, with the portion of the first image and the second image, an indication that the third image is available. In another example, the method also includes providing for display the indication in a first state when the third image has not been viewed by an operator and providing for display the indication in a second state, different from the first state, when the third image has been viewed by the operator. In another example, the method also includes providing for display, with the portion of the first image and the second image, a map including a first marker indicating a location where an image is available for only one date and a second marker indicating a second location where a set of images is available for different dates. In this example, the method also includes providing for display the second marker in a first state when no images of the set of images have been viewed by an operator and providing for display the indication in a second state, different from the first state, when at least one image of the set of images has been viewed by the operator. In another example, the method also includes receiving input confirming the area of the second image and altering the area of the third image by blurring image pixels corresponding to the area of the third image. In this example, determining the area of the third image is performed after the input confirming the area of the second image is received. In another example, the method also includes receiving input confirming the area of the third image and altering the area of the third image by blurring image pixels corresponding to the area of the third image. In another example, the method also includes automatically modifying image pixels corresponding to the area of the third image before providing the third image for display.

Another aspect of the disclosure provides a system having one or more computing devices. The one or more computing devices are configured to receive a request to alter a first image, the request identifying at least a portion of the first image and provide for display the portion of the first image and a second image. The second image is associated with three dimensional geometry data corresponding to a surface of an object depicted in both the first image and the second image and with date information identifying when the second image was captured. The one or more computing devices are also configured to receive input identifying an area of the second image and identify a third image based on date information identifying when the third image was captured and the date information identifying when the second image was captured. The third image is associated with three dimensional geometry data corresponding to a surface of the object depicted in the third image. The one or more computing devices are also configured to determine an area of the third image based on the three dimensional geometry data associated with the third image, the three dimensional geometry data associated with the second image, and the area of the second image, and the one or more processors are also configured to provide information identifying the area of the third image for display with the third image.

In one example, the one or more computing devices are also configured to provide for display, with the portion of the first image and the second image, an indication that the third image is available. In another example, the one or more computing devices are further configured to provide for display the indication in a first state when the third image has not been viewed by an operator and provide for display the indication in a second state, different from the first state, when the third image has been viewed by the operator. In another example, the one or more computing devices are also configured to provide for display, with the portion of the first image and the second image, a map including a first marker indicating a location where only one image is available for only one date and a second marker indicating a second location where a set of images is available for different dates. In another example, the one or more computing devices are also configured to provide for display the second marker in a first state when no images of the set of images have been viewed by an operator and provide for display the indication in a second state, different from the first state, when at least one image of the set of images has been viewed by the operator. In another example, the one or more computing devices are further configured to receive input confirming the area of the second image, alter the area of the third image by blurring image pixels corresponding to the area of the third image, and perform the determining the area of the third image after the input confirming the area of the second image is received. In another example, the one or more computing devices are also configured to receive input confirming the area of the third image and alter the area of the third image by blurring image pixels corresponding to the area of the third image. In another example, the one or more computing devices are also configured to automatically modify image pixels corresponding to the area of the third image before providing the third image for display.

A further aspect of the disclosure provides a non-transitory computer-readable storage medium on which computer readable instructions of a program are stored. The instructions, when executed by one or more processors, cause the one or more processors to perform a method. The method includes receiving a request to alter a first image. The request identifies at least a portion of the first image. The method also includes providing for display the portion of the first image and a second image. The second image is associated with three dimensional geometry data corresponding to a surface of an object depicted in both the first image and the second image and with date information identifying when the second image was captured. The method includes receiving input identifying an area of the second image and identifying, a third image based on date information identifying when the third image was captured and the date information identifying when the second image was captured. The third image is associated with three dimensional geometry data corresponding to a surface of the object depicted in the third image. The method also includes determining an area of the third image based on the three dimensional geometry data associated with the third image, the three dimensional geometry data associated with the second image, and the area of the second image, and the method includes providing information identifying the area of the third image for display with the third image.

In one example, the method also includes providing for display, with the portion of the first image and the second image, a map including a first marker indicating a location where only one image is available for only one date and a second marker indicating a second location where a set of images is available for different dates. In another example, the method also includes receiving input confirming the area of the second image, and altering the area of the third image by blurring image pixels corresponding to the area of the third image. In this example, determining the area of the third image is performed after the input confirming the area of the second image is received. In another example, the method also includes receiving input confirming the area of the third image and altering the area of the third image by blurring image pixels corresponding to the area of the third image.

DETAILED DESCRIPTION

Overview

Figure 1:
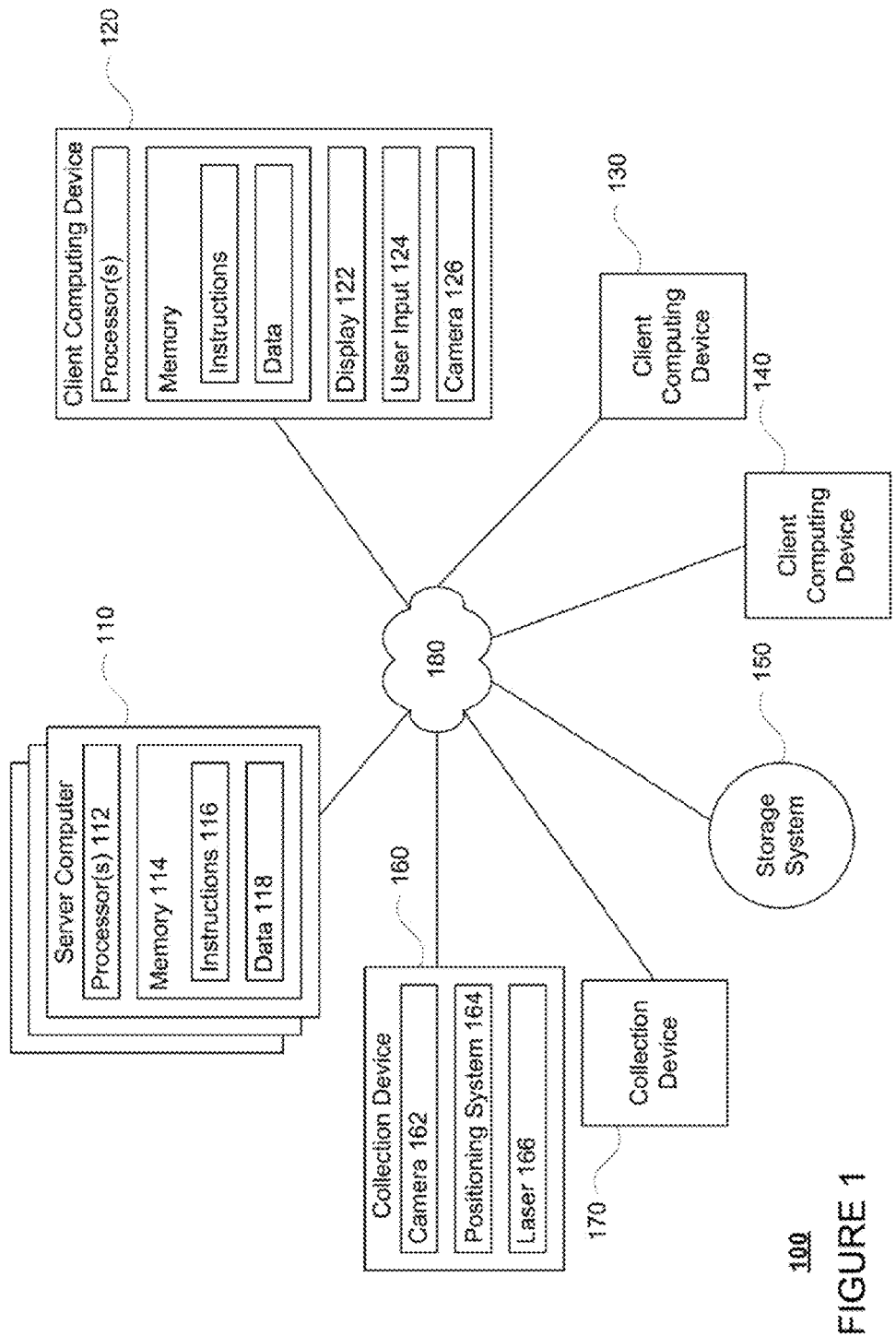
FIG. 1 is a functional diagram of an example system in accordance with aspects of the disclosure.

The technology relates to blurring or otherwise altering images, such as street level images, based on user requests. For example, a user may browse through various street level images and submit a request that a particular object, such as a building or vehicle, be blurred when viewed by other users. In order to do so, the user may line up an image in a view port such that the object appears in the center of the viewport. Alternatively, the user may select an image including the object in order to indicate the object (without identifying a specific portion of an image), mark the object in an image by drawing a box or boundary around the object, identify the object by providing a location, etc. Once the request is submitted, the request may be entered in a queue for review by an operator. The operator may then manually review images of the object and mark the object to be blurred. In the case where there are several different images of the same object captured at different times, the object may also be blurred in those images as well. As a result, other users viewing the blurred image would not be able to view the object.

The images described above may include street level panoramic images. Each of these panoramic images may have been captured by a camera device mounted on a vehicle as the vehicle is driven along a street. As the panoramic image is captured, the camera device, or another device, may identify and associate location and orientation information corresponding to a two or three dimensional (2D or 3D) location of the panoramic image. In addition to the image and location, each image may also be associated with 3D geometry information corresponding to points on the surface of any objects in that panoramic image. For example, as the vehicle is driven along the street, a laser may be used to collect laser data or light intensity information which is used to determine three dimensional points on the surface of objects. These objects will correspond to objects that are included in a panoramic image that was captured at approximately the same location as the laser data. In other examples, the 3D geometry may be derived from the collected images using image processing techniques such as structure from motion or other computer vision algorithms.

Once a request is at the top of an operator's queue, the operator may view the reference image in the request. The operator may then select an image for any given timeframe, for example collection dates and times for the images, and view a list of images from other timeframes to be reviewed. Information indicating the locations of nearby images to be reviewed may also be displayed for example using a map view. These nearby images as well as the list of images from other timeframes may be selected based on a proximity to the reference image. For example, images may be selected for review based on a 2D distance from the reference image. This distance may be any reasonable value and may be adjusted based upon the needs of the system and the type of imagery being captured.

The operator may then identify the object in the reference image of the request and draw or otherwise identify a bounding box around the object in a corresponding image to be blurred. Once the operator is satisfied, he or she may save the bounding box using various features. After the initial bounding box has been saved, the system may automatically blur or otherwise alter any objects within the box.

In order to propagate the blurring or altering to other images of the object, the operator may switch to a view of a second image, such as an image associated with the corresponding image that was during a different timeframe. In response, the system may automatically calculate a suggested bounding box based on the bounding box drawn for the corresponding image. For example, the 3D geometry associated with both the corresponding image and the second image may be used to approximate the suggested bounding box. In this regard, the bounding box may be projected onto the 3D surfaces of the corresponding image and the 3D locations of that projection may be used to draw a suggested bounding box in the second image. The operator may then adjust, replace, or otherwise reconfigure the suggested bounding box until he or she is satisfied and save the changes so that this bounding box will also be blurred or otherwise altered.

Alternatively, rather than appearing to the operator as a suggestion, the bounding box may actually be propagated through to any of the other associated images such that they are automatically blurred or altered. In this example, the operator may review the blurred areas or bounding boxes (un-blurred) to confirm that they are correct, etc.

To help the operator keep track of which images he or she has reviewed or visited (whether or not a bounding box has been saved for the image), various indicators may be used. As a first example, associated image information may be displayed in a first way, such as blinking or bolded or faded, until the operator has viewed the image, after which it may be displayed in a second way, such as not blinking or not bolded or not faded. In addition, the map information may be displayed in a first color when an image and its associated images have not been reviewed and in a second color when the image and its associated images have been reviewed.

In addition, as new images captured during new or later timeframes are added to the images available to users, the features described above may also be used to propagate blurring to these new images. Other information cues to assist the operator may also be displayed such as an arrow indicating the orientation of an object that has been blurred relative to a satellite or map image.

The features described above allow an operator to quickly and easily identify regions that should be blurred or otherwise altered in images that were captured during different timeframes, or rather during different dates and times.

Example Systems

Figure 2:
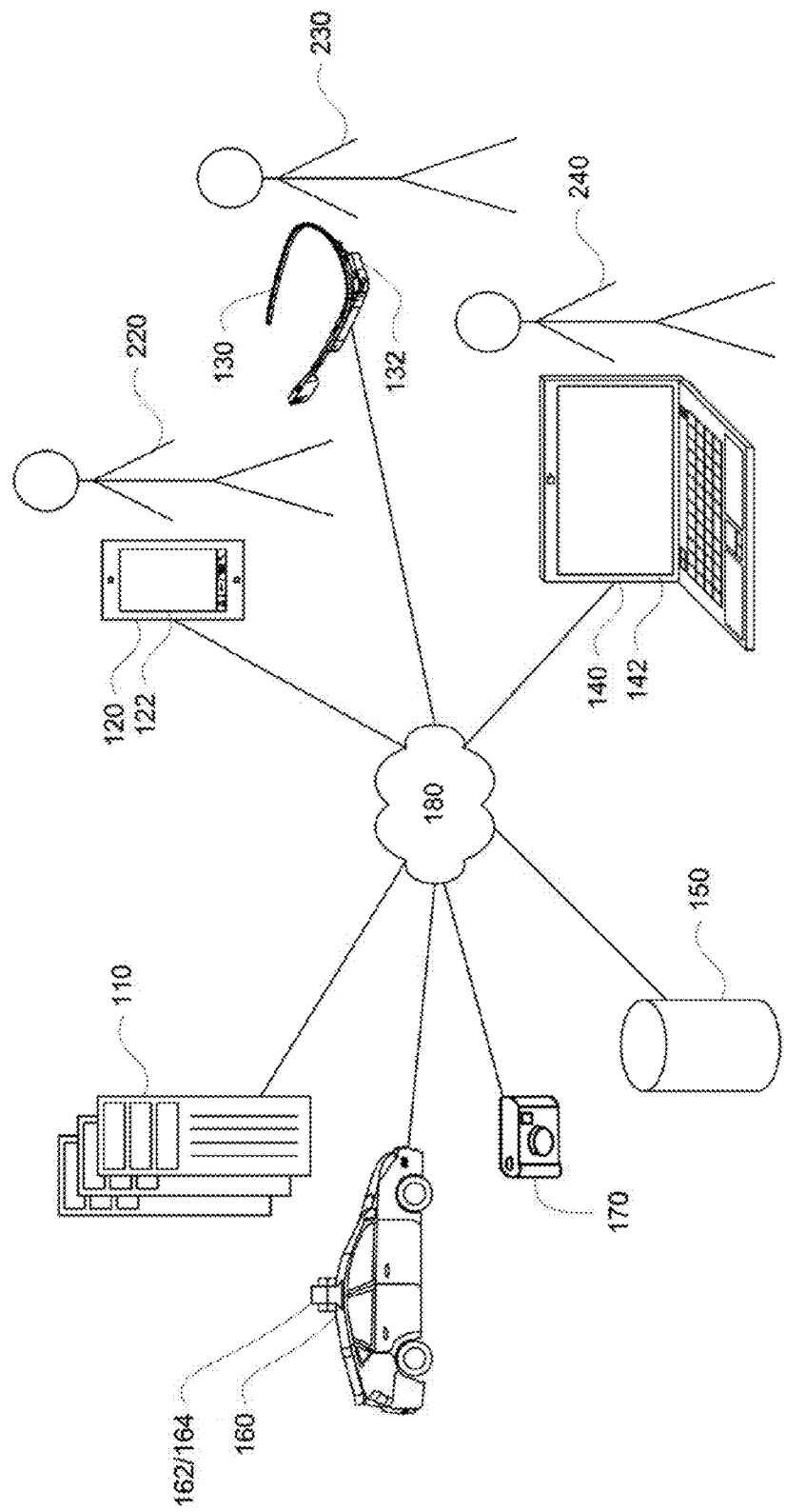
FIG. 2 is a pictorial diagram of the example system of FIG. 1.

FIGS. 1 and 2 include an example system 100 in which the features described herein may be implemented. It should not be considered as limiting the scope of the disclosure or usefulness of the features described herein. In this example, system 100 can include one or more computing devices 110, 120, 130, and 140, storage system 150, as well as collection devices 160 and 170. One or more computing devices 110 can contain one or more processors 112, memory 114 and other components typically present in general purpose computing devices. Memory 114 of the one or more computing devices 110 can store information accessible by one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor. Although not necessary, one or more computing devices 110 may include specialized hardware components to perform specific computing processes, such as decoding video, matching video frames with images, distorting videos, encoding distorted videos, etc. faster or more efficiently.

Although FIG. 1 functionally illustrates the processor(s), memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in one or more housings different from those of the one or more computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 180.

The one or more computing devices 110 can be at various nodes of a network 180 and capable of directly and indirectly communicating with other nodes of network 180. Although only a few computing devices are depicted in FIGS. 1-2, it should be appreciated that a typical system can include a large number of connected computing devices, with each different computing device (as well as collection device) being at a different node of the network 180. The network 180 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, the one or more computing devices 110 may include one or more web servers that are capable of communicating with storage system 150 as well as computing devices 120, 130, and 140 via the network. For example, one or more server computing devices 110 may use network 180 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 may store various types of information. As described in more detail below, the storage system 150 may store images, such as those described above as having a field of view which is greater than that of the human eye, e.g., 180 degrees or greater. In that regard, example panoramic images described herein provide a 360-degree view of a location, though other types of images may also be used. In addition, each panoramic image may be associated with geographic location information indicating the location (such as latitude and longitude or other location coordinates) and, in some cases, the orientation (heading) at which the panoramic image was captured (e.g., which part of the panoramic image is oriented towards "North", etc.) as well as timestamp information indicating the date and time at which the panoramic image was captured.

The storage system 150 may also store 3D geometry data. As explained above and described in more detail below, this 3D geometry data may correspond to points on the surface of any objects in the plurality of panoramic image. The 3D geometry data may provide the position (x,y,z) of points relative to a particular coordinate system (e.g. relative to a position of a LIDAR system that generated the geometry data or a global positioning system (GPS) such as latitude, longitude, and altitude coordinates).

Storage system 150 may also store map information. The map information may be an image based map or may include a plurality of vectors used to identify the shape, orientation, and other characteristics of streets used to display a map. In this regard, the streets may be divided into discrete road segments. As an example, collection of such road segments (or vectors) may be used to display a map.

As with memory 114, storage system 150 can be of any type of computerized storage capable of storing information accessible by server 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 180 as shown in FIG. 1 and/or may be directly connected to or incorporated into any of the computing devices 110-140 (not shown).

Collection devices 160 and 170 may include a computing device, configured similarly to one of the server computing devices or client computing devices with a processor and memory storing data and instructions (not shown in FIG. 1 for simplicity). Collection device 160 and 170 may also provide all or some of the images of storage system 150. Each of the collection devices 160 and 170 may include a camera or other information collection device. For example, collection device 160 may include a camera 162 mounted on a vehicle. As the vehicle is driven along a street, the camera of collection device 160 may capture panoramic images. In this regard, all or some of the panoramic images of storage system 150 may be considered "street level images." As another example, collection device 170 may include a camera rig attached to a backpack (e.g., for paths and other non-street areas), a smartphone camera, a dedicated camera device, etc. which a person walks, bikes, or otherwise moves around with in order to capture panoramic images. In addition to capturing images, the collection devices and/or camera may be configured to provide each panoramic image with a timestamp indicating the date and time at which the image was captured. The captured panoramic images and timestamps may be uploaded or downloaded to the storage system 150.

Each of collection devices 160 or 170 may include a position system 164 in order to determine the camera's relative or absolute position on a map or on the Earth when an image is captured. For example, the position system 164 may include a GPS receiver to determine the device's latitude, longitude and/or altitude position and provide a 2D or 3D location at which each panoramic image was captured by the collection device. Other location systems such as laser-based localization systems, inertial-aided GPS, trilateration/triangulation, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than an absolute geographical location.

The positioning system 164 may also include other devices in communication with the camera or collection device, such as an accelerometer, gyroscope or another direction/speed detection device to determine the orientation of the camera 162 when the panoramic image was captured. By way of example only, an acceleration device may determine its pitch, yaw or roll (or changes thereto) relative to the direction of gravity or a plane perpendicular thereto. The device may also track increases or decreases in speed and the direction of such changes.

The collection device's provision of location and orientation data as set forth herein may be associated with the panoramic images as they are being captured and provided automatically to the storage system 150, other computing devices and combinations of the foregoing. Although camera 162 and position system 164 are depicted within the collection device 160, these components may or may not be included in the same physical housing. In this regard, the position system 164 may be a different device from the camera 162 such that both components output the 2D or 3D location information and orientation information and panoramic images to the collection device which processes these outputs in order to associate them with one another and provide them to the storage system 150.

In some examples, the collection device 160 may include a LIDAR system 166 including a laser for generating the 3D geometry data described above. For example, as a vehicle is driven along the street, a LIDAR system may be used to collect laser data or light intensity information which is converted into 3D points on the surface of objects. These objects will correspond to objects that are included in a panoramic image that was captured by a camera, such as camera 162, at approximately the same geographic location as the laser data.

Example Methods

Before processing user blurring requests as discussed above, the images of storage system 150 (at least some of which are street level images) must first be captured and stored. As noted above, these images may be captured by a camera mounted on a vehicle (or other device). In this regard, images, such as panoramic and non-panoramic images, may be captured in a sequence as the camera is moved along. Each image may be associated with 2D or 3D location and orientation information corresponding to the geographic location where the image was captured as well as a timestamp indicating the date and time when the image was captured. For example, as a collection device such as collection device 160 is moved around, such as by driving a vehicle along a street, camera 162 may capture panoramic images. At the same time, the position system 164 may provide GPS or other location coordinates for each panoramic image captured by camera 162. When the collection device 160 captures a series of images on a given date (for example, Jan. 1, 2013 or Feb. 1, 2013) may be considered a separate timeframe.

FIG. 3A is an example diagram 300 of a birds-eye view of a portion of a street 302 including six lanes 304, 306, 308, 312, 314, and 316. The six lanes are divided into two sections by double lane lines 310. Those appearing above double lane lines 310 are westbound lanes, while those below are eastbound. In this example, the circles correspond to the 2D locations (x,y) of street level images. These circles or images are arranged into five different timeframes 320-328. Again, each timeframe may correspond to a specific date and range of times (for example, Jun. 1, 2013 from 10:00 am to 3:00 pm, Jun. 1, 2013, June 2013, etc.) on which a collection device captured the images of that timeframe. In this example, the images of timeframes 320, 322, and 324 appear in the westbound lanes 304, 306, and 308, while the images of timeframes 326 and 328 appear in the eastbound lanes 312 and 314 (but not 316). Here, the images are street level panoramic images. The street level panoramic of timeframe 320 were collected by camera 162 of collection device 160 as the vehicle was driven along lane 304 of street 302. The street level panoramic images of timeframes 322-328 may have been collected by the same or a different collection device, but each the images of each timeframe correspond to a different collection date. In the example of FIG. 3A, the images of the different timeframes occur in different lanes for clarity, but this does not necessarily need to be the case. Images from multiple timeframes (e.g., 320, 322) could appear in the same lane (e.g., 306).

As the images are collected during the different timeframes, 3D geometry data corresponding to objects in those images may also be collected. For example, as collection device 160 is driven along the street 302, LIDAR system 166 may be used to collect laser data or light intensity information corresponding to the surfaces of buildings 330-338. As noted above, this information is converted into three dimensional points on the surface of those buildings. Thus, this information may describe objects that are included in and image that was captured at approximately the same location as the laser data, for example, any of the street level panoramic images of timeframes 320-328. In other examples, the 3D geometry may be derived from the collected images using image processing techniques such as structure from motion or other computer vision algorithms.

Though not required, each individual image or timeframe may be associated with its own 3D geometry data. Alternatively, the 3D geometry data may be retrieved from storage using the 2D or 3D location information for a panoramic image.

In some instances, because of the noise inherent in the GPS coordinates, the location information for the images may also be processed in order to reduce noise in the raw data. For example, laser data, for example generated by a LIDAR system, may be used to shift, confirm, or otherwise correct the GPS coordinates of an image of a timeframe. In addition, the GPS coordinates of each other image of a timeframe may also be shifted so that they remain the same relative distance from the lines corresponding to the 3D geometry data for the images of that shifted timeframe. This processed (or in some examples, unprocessed) location and orientation information may be referred to as the location of the panoramic image.

As noted above, these collected images may be processed and provided to users. The processing may involve blurring portions of images that correspond to people's faces, license plates, etc. A user may then send a request for images using his or her client computing device to the one or more service computing devices. In response, the one or more server computing devices may provide one or more images to the client computing device for display to the user.

In addition, as noted above, users may access the images and request that the image be blurred. For example, when an image is displayed on a user's client computing device, the user may attempt to center the view of the image on a certain object or objects, such as buildings or vehicles, which the user would like to be blurred. Once the user is satisfied with the view, he or she may select an option to submit a request to blur the image. In this regard, the client computing device may send a request to blur an image to the one or more server computing devices identifying the image (hereafter a "reference image") and a view of that image (the view provided by the user). Alternatively, rather than identifying a view of an image by orienting an image to a particular view, the user may simply identify an image including the object in order to indicate the object (without identifying a specific portion of an image), mark the object in an image by drawing a box or boundary around the object, identify the object by providing a location, etc. In this regard, a request may identify a sub portion of portion of an image, the entire image, a particular view or orientation of an image, or a geographic location.

When requests are received by the one or more server computing devices, they may be provided to a client computing device of a human operator for review. In this regard, each such client computing device may access a queue of requests for the particular human operator from the one or more server computing devices. These requests may be processed as described in more detail below.

Figure 4:
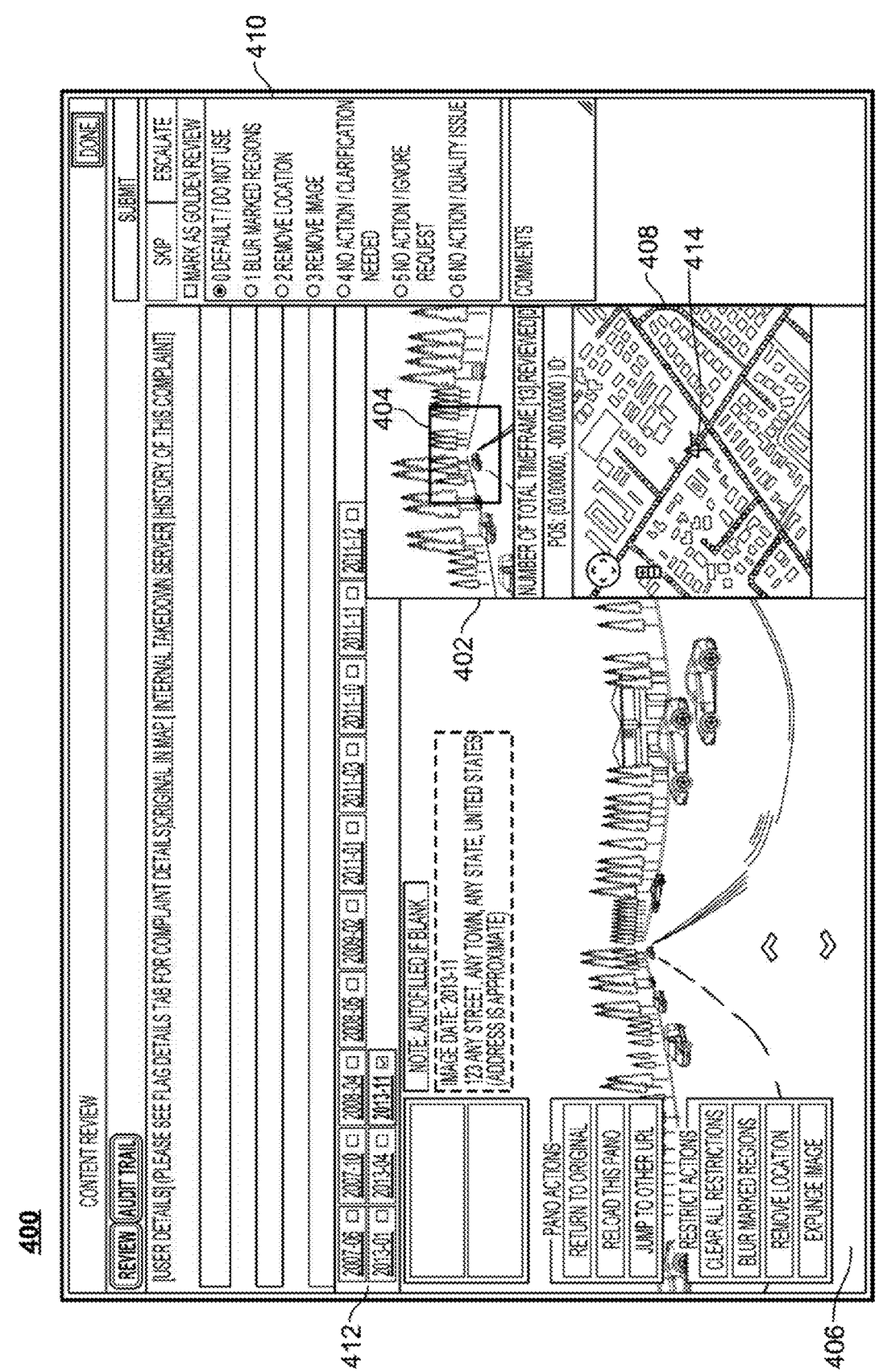
FIG. 4 is an example screen shot in accordance with aspects of the disclosure.

For example, once a request is at the top of an operator's queue, the operator may use a user interface to view a reference image for the request. For example, FIG. 4 is an example screen shot 400 of a user interface that an operator may use to view a reference image. In this example, the user interface includes a display of the reference image 402. Reference image 402 also includes a box 404 corresponding to a view, box, boundary, etc. included in the request. Again, as noted above, if the request includes a geographic location, this geographic location may be used to identify an image, for example, based on proximity of the location information of the identified image and the geographic location. In this example, the identified image may correspond to the reference image, and no box (such as box 404) may be shown. Similarly, if the request identifies an image (without a view, box, boundary, etc.), this image may correspond to the reference image but no box (such as box 404) may be shown.

In this example, image 406 may have been captured from a timeframe corresponding to the month of November of 2013, as shown by the highlighted box corresponding to 2013-11 of the set of links 412. Image 406 may be an image of storage system 150 that is displayed to the operator in order to be reviewed in reference to the reference image 402. Image 406 may actually be a different image from image 402 or another display of the reference image 402 that the operator may use to identify which portions of image 406 are to be blurred using one or more of the options of option list 410 discussed in further detail below.

The operator may then select an image for any given timeframe and view a list of images from other timeframes to be reviewed. For example, screen shot 400 also includes a set of links 412 corresponding to a list of images that were captured at approximately the same location as reference image 402, but at different times, or rather from different timeframes as described above. In this example, image 406 may have been captured in November of 2013, as indicated by the set of images 412.

Information indicating the locations of nearby images to be reviewed may also be displayed for example using a map view. For example, screen shot 400 includes a map 408 having a plurality of circles. Although shown as a road map, map 408 may include a satellite image or a combination of a satellite image and a road map. Each circle may represent the location of one or more images that is nearby the location of reference image 402 that are available for review or can be reviewed by the operator for the request. Markers other than circles may also be used to identify the location of nearby images available for review. Other information cues to assist the operator may also be displayed such as a fan 414 indicating the orientation of the displayed of image 406.

In some example, the map may provide additional information about the images that are available for review. In the example of map 408, certain circles are shown as open while others are shown as closed to indicate whether or not images from multiple timeframes are available. For instance, an open circle may indicate that more than one image or rather images from more than one different timeframe are available for review for the location of the circle. Similarly, a closed circle may indicate that only a single image is available for review for the location of the circle.

These nearby images as well as the set of links for the list of images from different timeframes may be selected based on a proximity to the location of the reference image. In that regard, images of storage system 150 may be included in nearby image and list of images from different timeframes based on a 2D distance from the location of the reference image 402.

Figure 3:
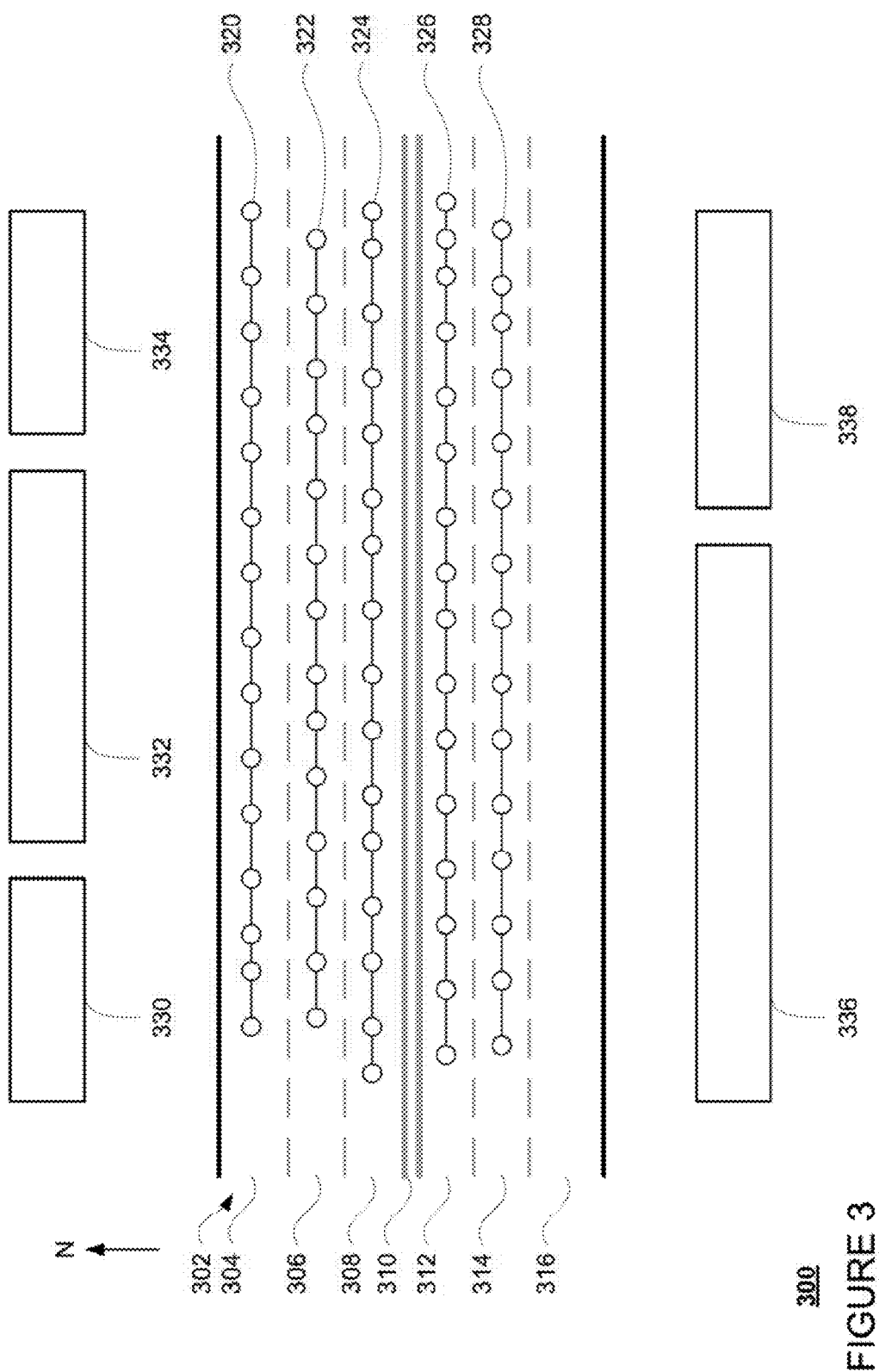
FIG. 3 is an example diagram of image collection locations in accordance with aspects of the disclosure.
Figure 5:
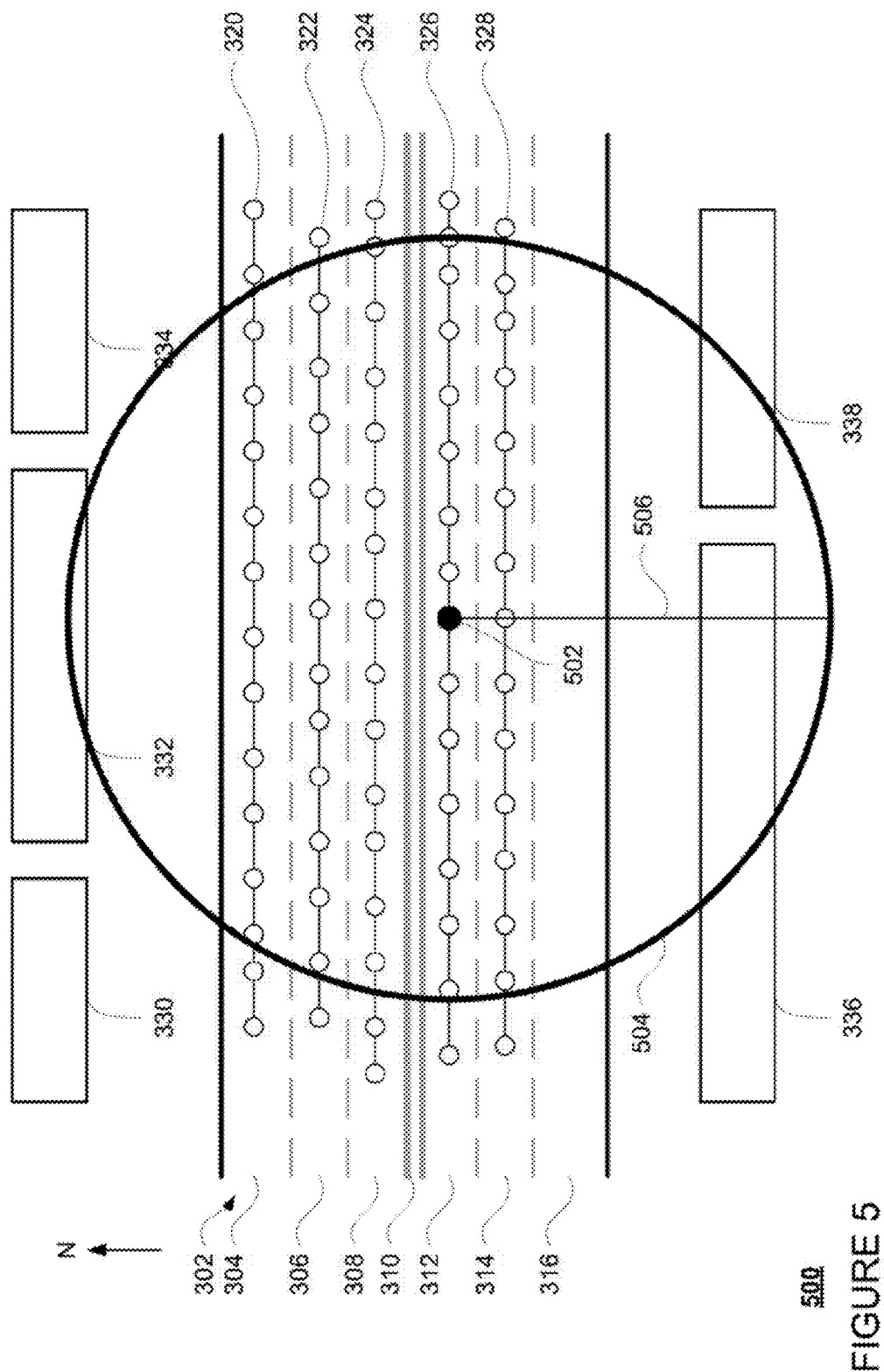
FIG. 5 is an example diagram of identifying images in accordance with aspects of the disclosure.

FIG. 5 is another example diagram 500 of street 302 of FIG. 3. In this example, circle 502 of timeframe 326 may correspond to the location of reference image 402. Circle 504 may thus represent a fixed distance 506 from the location of reference image 402. Again, distance 506 may be any reasonable value, such as 10, 50 100, or even 300 (or more) meters, and may be adjusted based upon the needs of the system and the type of imagery being captured. In this regard, any images having locations within circle 504 may be selected as nearby images and/or the list of images from different timeframes. For instance, the images of timeframe 326 that are within circle 504 may be included in the nearby images, while one or more of the images of timeframe 320, 322, 324, and 328 that are within circle 504 may be included in the lists of images from different timeframes for each of the images of timeframe 326 that are within circle 504.

When the images of storage system 150 are made available to requests from users, the images may be entered into one or more spatial indices. These spatial indices may include databases indexed by using a system for dividing the earth into boxes at various sizes, such as Schneider 2 or S2 cells. In one example, the surface of the earth may be projected onto a cube with six faces. At each successive level, cells at the previous level are divided into four subcells. The images of storage system 150 may be indexed at a particular level, such as level 17, at which there are $6*4^17=103$ billion possible cells.

To look up images around a particular location, a list of S2 cells that intersect with a circle, such as circle 504 of the example of FIG. 5, around that point may be constructed. All of the images from those S2 cells may be reviewed, and those that fall into the circle may be returned. This may be computationally reasonable because S2 cells have the property that cells nearby in space will have IDs nearby in alphabetical order, so the database reads are well localized. Thus, level at which the images are indexed must be selected based on a tradeoff between reading more distinct cells (smaller cells) and reading more non-matching candidates when each cell is read (larger cells).

The operator may then identify what object or objects in the reference image of the request the user who submitted the request would like to blur or alter given the box corresponding to the view included in the request (for example, box 404). Based on this, the operator may, for example using a mouse pointer, or finger or stylus and touch screen, or other input draw a bounding box or other shape around the object or objects in the in image 406. This bounding box may represent an area that will be blurred or otherwise altered when the image is later provided to client devices of users. For example, as shown in screen shot 600 of FIG. 6, an operator may draw box 612 which corresponds to the objects or objects that the operator believes should be blurred or otherwise altered given the box 404 of reference image 402.

Figure 7:
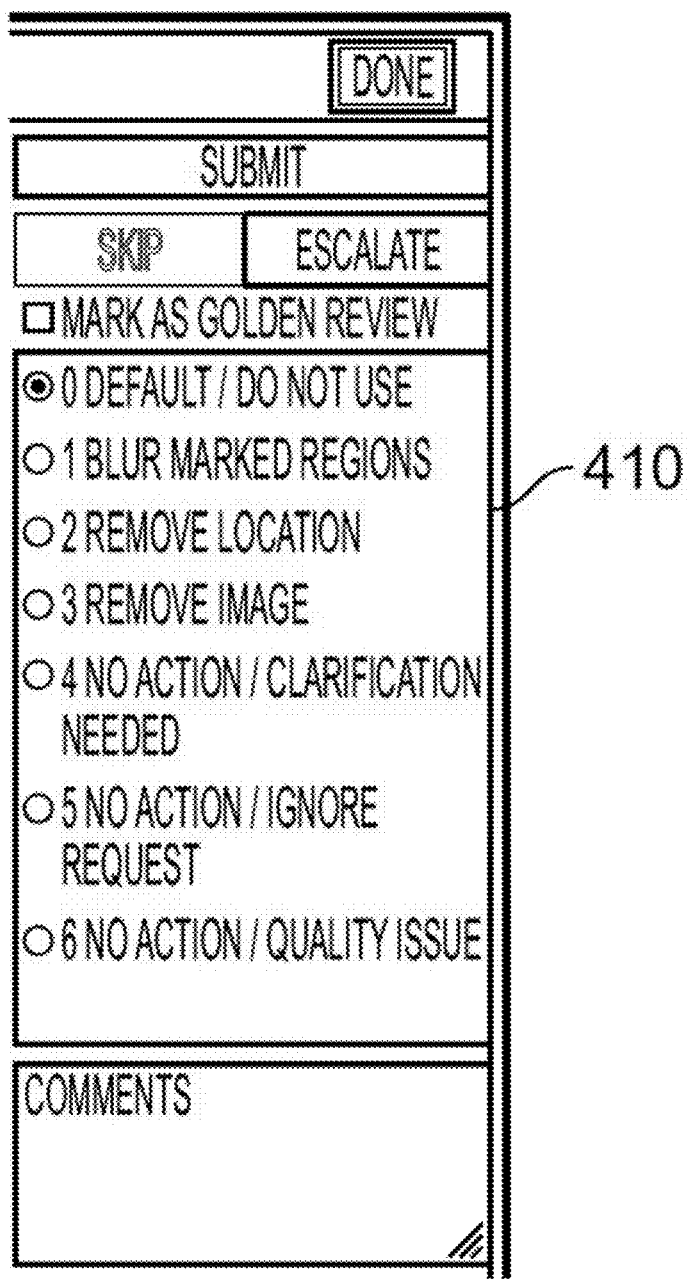
FIG. 7 is a detailed view of some of the features of the example screen shot of FIG. 6.

Once the operator is satisfied, he or she may save the bounding box so that it may be blurred or otherwise altered when later provided to client devices of users. In this regard, FIG. 7 is an example 700 of the option list 410. Using these options, once the operator is satisfied with the bounding box, he or she may select option 1 to blur the area of the bounding box and select the submit option to save the area of the bounding box.

After the initial bounding box has been saved, the system may automatically blur or otherwise alter any objects within the bounding box. The blurring or altering of the area within a bounding box may use any known techniques to change the color values of all or some of the pixels within the bounding box.

Figure 8:
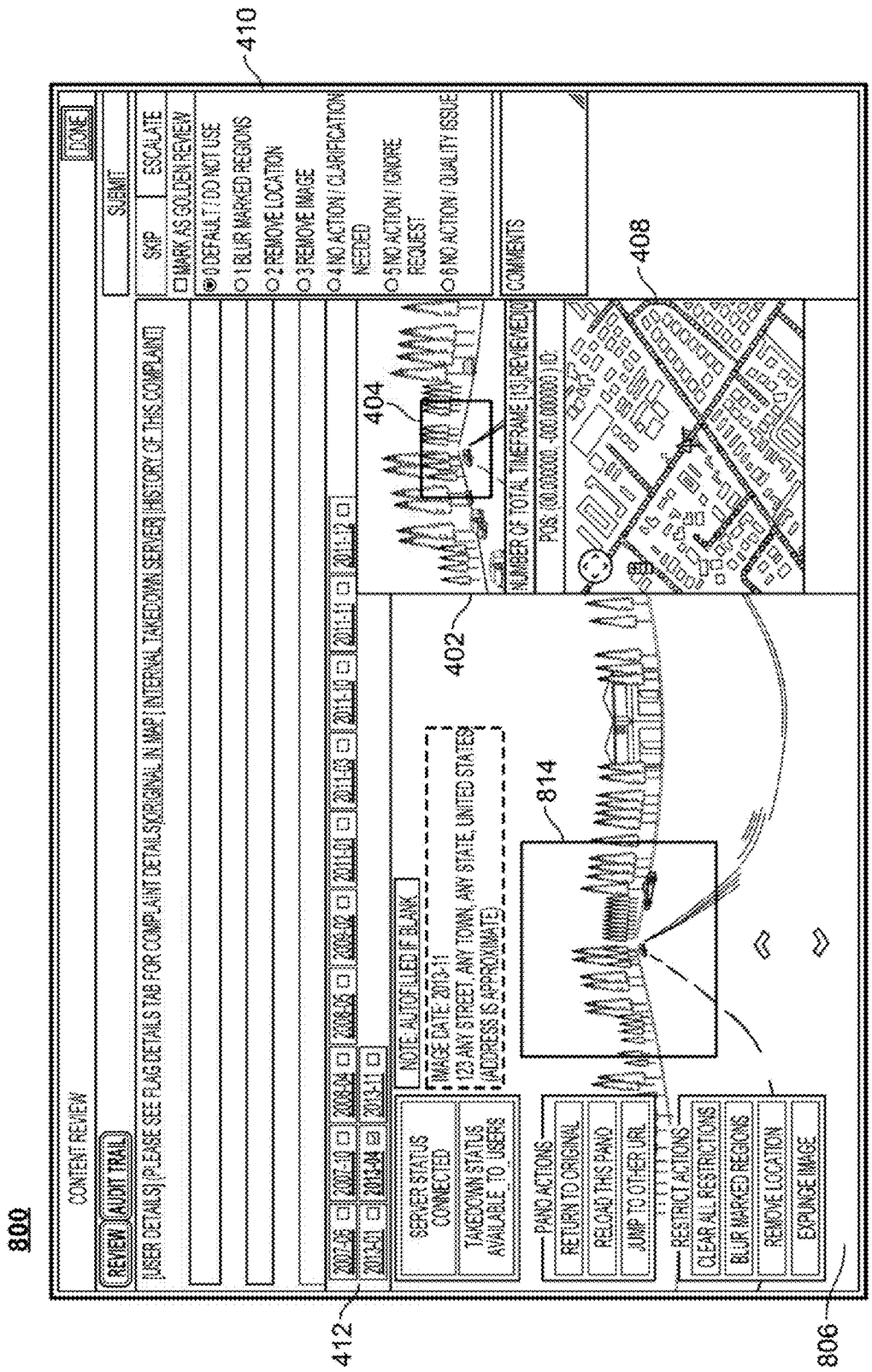
FIG. 8 is another example screen shot in accordance with aspects of the disclosure.

In order to propagate the blurring or altering to other images of the object or objects, the operator may select one of the set of links 412 to review an image from a different timeframe, such as an image having a similar location as the image 406. For example, returning to FIG. 6, the operator may select the link of the set of links corresponding to 2013-04 or April 2013 in order to view and image that was captured from a timeframe corresponding to the month of April of 2013. As shown in FIG. 8, the box corresponding to 2013-04 of the set of links 412 is now shown as highlighted and a new image 806 is displayed to the operator for review.

Once the operator has selected a link to another image from another timeframe as discussed above, the client computing device of the operator or the one or more server computing devices may automatically calculate a suggested bounding box based on a previously saved bounding box. For example, using the 3D geometry associated with both the image 406 and image 806, the computing device may approximate the suggested bounding box. In this regard, the bounding box may be projected onto the 3D surfaces of objects from the image 406 and the 3D locations of that projection may be used to project a suggested bounding box onto image 806.

The operator may then adjust, replace, or otherwise reconfigure the suggested bounding box until he or she is satisfied and save the changes so that this bounding box will also be blurred or otherwise altered. Alternatively, rather than appearing to the operator as a suggestion, the bounding box may actually be propagated through to any of the other associated images such that they are automatically blurred or altered. In this example, the operator may review the blurred areas or bounding boxes (un-blurred) to confirm that they are correct, etc.

In some instances, the object or objects within a bounding box saved for one image from one timeframe may not exist in an image of the same location from another timeframe. For example, an object in a bounding box at time N (as an example 2013-04) may not exist at time N-X (as an example 2009-03). For example, the client computing device or one or more server computing devices may process the image using computer vision techniques to identify objects within a saved bounding box. When the objects do not appear within a suggested bounding box, the computing device may not suggest any bounding box, because, for example, the object at time N is not detected at time N-X. This may occur, for instance, when someone request a blur of a sign on a building that was built in 2010. Thus, in some examples, after a first bounding box around an object has been saved for a first image, the computing device may determine a second bounding box in a second images that corresponds to the first bounding box and then process a portion of the second image within the second bounding box to determine whether the objects within the first bounding box are present within the second bounding box. If the objects are present, the computing device may automatically save the second bounding box for blurring or altering. If not, the computing device may flag the second image for review by the operator.

To help the operator keep track of which images he or she has reviewed or visited (whether or not a bounding box has been saved for the image), various indicators may be used. As a first example, individual links of the set of links may be displayed in a first way, such as blinking or bolded or faded, until the operator has viewed the image for that link, after which it may be displayed in a second way, such as not blinking or not bolded or not faded. In addition, the circles of map 408 may be displayed in a first color when the one or more images corresponding to the circle have not been reviewed and in a second color when the one or more images corresponding to the circle have been reviewed.

Figure 9:
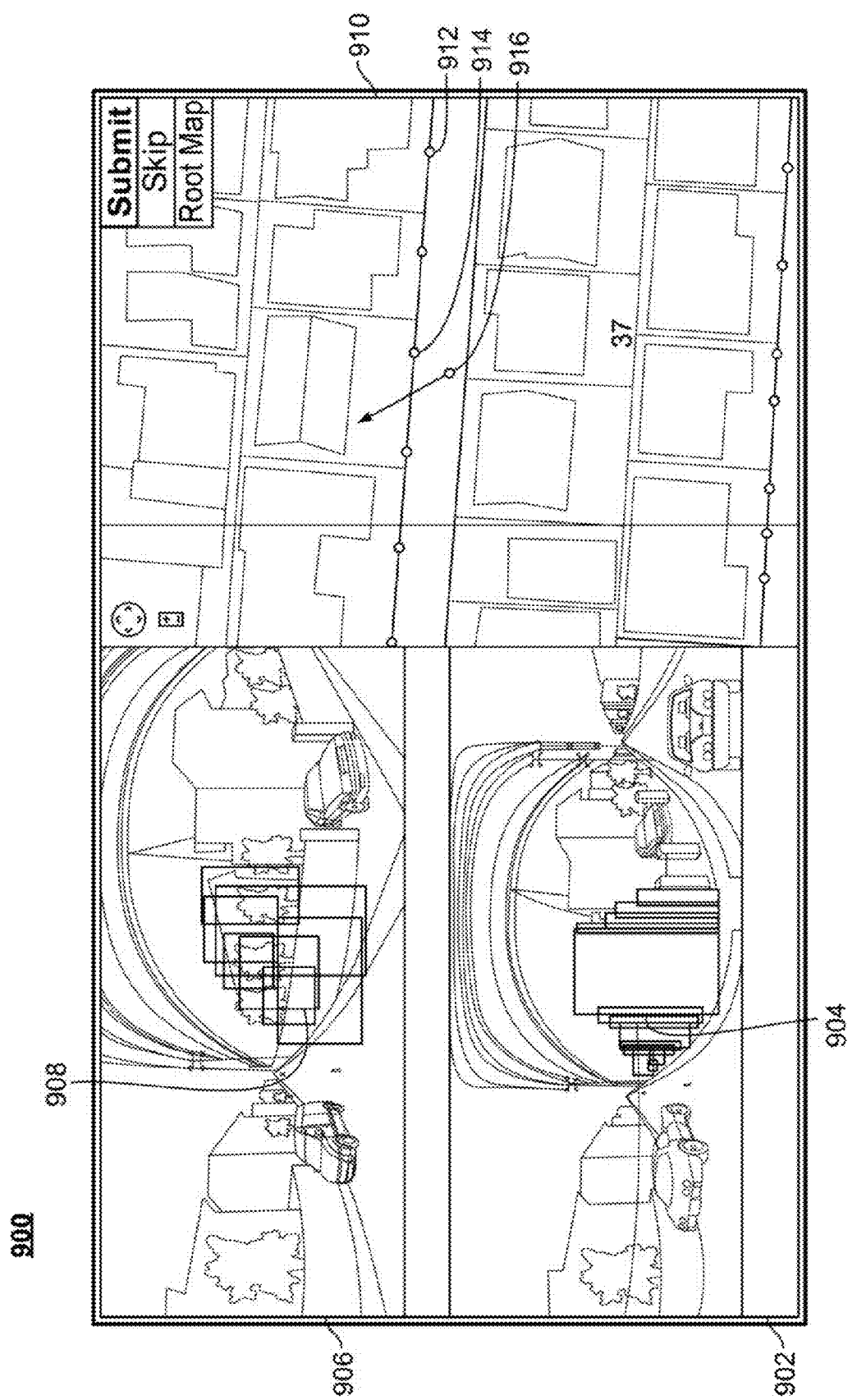
FIG. 9 is a further example screen shot in accordance with aspects of the disclosure.

In addition, as new images captured during new timeframes are added to the images available to users, the features described above may also be used to propagate blurring to these new images. For example, screen shot 900 of FIG. 9 is an example user interface for reviewing such new images. Image 902 of the user interface is an image that may already have been blurred or altered. In this regard boxes 904 may represent portions of image 902 that are blurred or otherwise altered. Image 906 may represent a new image that is under review by an operator. In this example, image 906 includes suggested bounding boxes 908 that may be determined by the operator's client computing device or the one or more server computing devices 110. As with the examples of images 406 and 806 above, using the 3D geometry associated with both the image 902 and image 906, the computing device may approximate the locations of the suggested bounding boxes 908. In this regard, the areas of bounding boxes 904 may be projected onto the 3D surfaces of objects from the image 902 and the 3D locations of that projection may be used to project a suggested bounding box onto image 906. Again the operator may adjust the locations of the suggested bounding boxes, add or remove bounding boxes until the operator is satisfied and save the changes so that this bounding box will also be blurred or otherwise altered.

Figure 6:
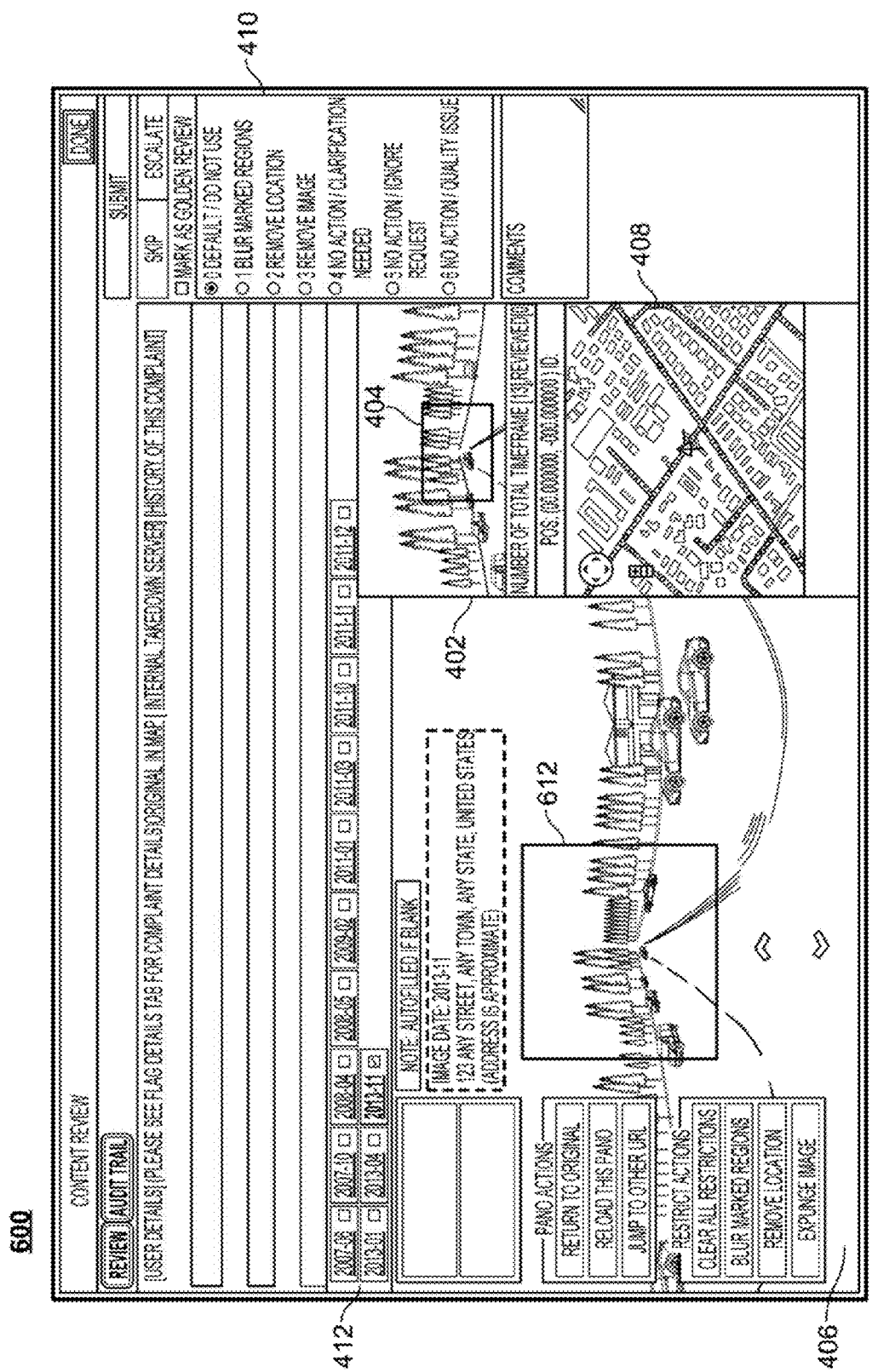
FIG. 6 is an example screen shot in accordance with aspects of the disclosure.

As with the examples of FIGS. 4, 6, and 8, the user interface for reviewing such new images may include a map 910 in order to assist the user in reviewing the new images. Again, although shown as a road map, map 910 may include a satellite image or a combination of a satellite image and a road map. In this example, the map 910 includes a plurality of circles, such as circles 912 and 914, that correspond to new images within the fixed distance (again 10, 20, 30, or more meters) of the locations or image 902 and/or the bounding boxes 904 of image 902. Other information cues to assist the operator may also be displayed such as an arrow 916 indicating the orientation of an object that has been blurred relative to map 910 and/or the location of image 902.

Figure 10:
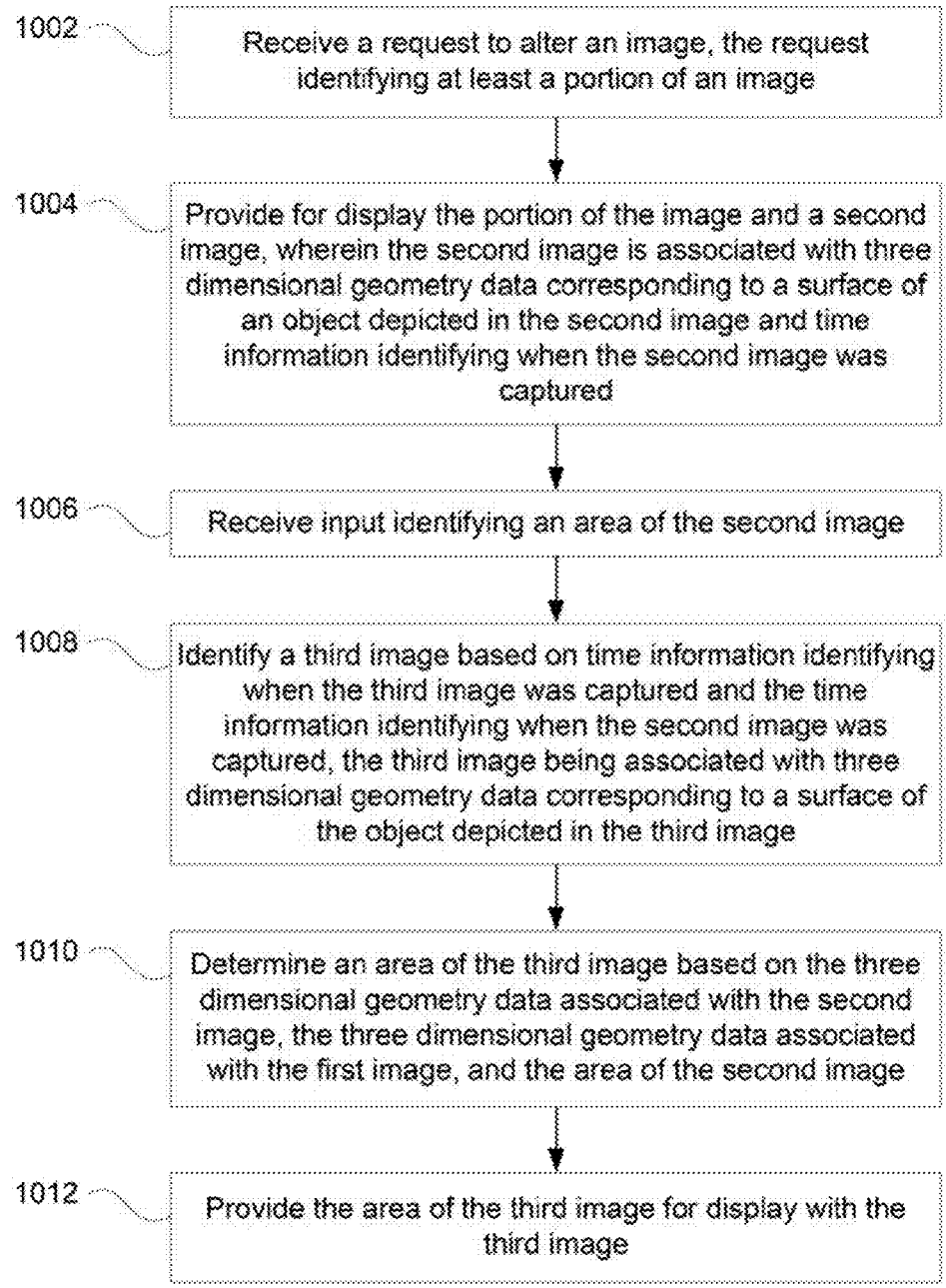
FIG. 10 is an example flow diagram in accordance with aspects of the disclosure.

Flow diagram 1000 of FIG. 10 is one example of some of the features described above which may be performed by one or more computing devices such as one or more server computing devices 110, or one or more client computing devices, such as client computing devices 120, 130, and 140. In this regard, the one or more computing devices receive a request to alter a first image, the request identifying at least a portion of the first image at block 1002. Again, this at least a portion may include a whole image, or a sub portion of an image, such as the view, box, boundary examples described above. Alternatively, rather than identifying at least a portion of an image, the request may simply identify a geographic location that can be used by the one or more server computing devices to identify the first image based on a location associated with the first image.

The one or more computing devices provide for display of the portion of the first image and a second image at block 1004. The second image is associated with three dimensional geometry data corresponding to a surface of an object depicted in both the first image and the second image and date information identifying when the second image was captured. The one or more computing devices receive input identifying an area of the second image at block 1006. The one or more computing devices also identify a third image based on date information identifying when the third image was captured and the date information identifying when the second image was captured at block 1008. The third image is associated with three dimensional geometry data corresponding to a surface of the object depicted in the third image. The one or more computing devices determine an area of the third image based on the three dimensional geometry data associated with the second image, the three dimensional geometry data associated with the second image, and the area of the second image at block 1010. Information identifying the area of the third image is provided by the one or more computing devices for display with the third image at block 1012.

Unless stated otherwise, the foregoing alternative examples are not mutually exclusive. They may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method comprising:
receiving, by one or more computing devices, a request to blur an object in a first image, the request identifying at least a portion of the first image;
providing for display, by the one or more computing devices, a second image and the portion of the first image, wherein the second image is associated with three dimensional geometry data corresponding to a surface of the object depicted in both the first image and the second image and with date information identifying when the second image was captured;
receiving, by the one or more computing devices, user input identifying an area of the second image;
identifying, by the one or more computing devices, a third image based on date information identifying when the third image was captured and the date information identifying when the second image was captured, the third image being associated with three dimensional geometry data corresponding to a surface of the object depicted in the third image;
providing for display, with the second image and the portion of the first image, an indication that the third image is available;
determining, by the one or more computing devices, an area of the third image based on the three dimensional geometry data associated with the third image, the three dimensional geometry data associated with the second image, and the area of the second image;
providing, by the one or more computing devices, information identifying the area of the third image for display with the third image;
receiving input confirming the area of the third image; and
blurring image pixels corresponding to the area of the third image.

2. The method of claim 1, further comprising:
providing for display the indication in a first state when the third image has not been viewed by an operator; and
providing for display the indication in a second state, different from the first state, when the third image has been viewed by the operator.

3. The method of claim 1, further comprising providing for display, with the second image and the first portion of the first image, a map including a first marker indicating a location where an image is available for only one date and a second marker indicating a second location where a set of images is available for different dates.

4. The method of claim 3, further comprising:
providing for display the second marker in a first state when no images of the set of images have been viewed by an operator; and
providing for display the indication in a second state, different from the first state, when at least one image of the set of images has been viewed by the operator.

5. The method of claim 1, further comprising
receiving input confirming the area of the second image, and
wherein determining the area of the third image is performed after the input confirming the area of the second image is received.

6. The method of claim 1, further comprising automatically modifying image pixels corresponding to the area of the third image before providing the third image for display.

7. A system comprising one or more computing devices, wherein the one or more computing devices are configured to:
receive a request to blur an object in a first image, the request identifying at least a portion of the first image;
provide for display a second image and the portion of the first image, wherein the second image is associated with three dimensional geometry data corresponding to a surface of the object depicted in both the first image and the second image and with date information identifying when the second image was captured;
receive user input identifying an area of the second image;
identify a third image based on date information identifying when the third image was captured and the date information identifying when the second image was captured, the third image being associated with three dimensional geometry data corresponding to a surface of the object depicted in the third image;

provide for display, with the second image and the portion of the first image, an indication that the third image is available;

determine an area of the third image based on the three dimensional geometry data associated with the third image, the three dimensional geometry data associated with the second image, and the area of the second image;

provide information identifying the area of the third image for display with the third image;

receive input confirming the area of the third image; and blur image pixels corresponding to the area of the third image.

8. The system of claim 7, wherein the one or more computing devices are further configured to provide for display, with the second image and the portion of the first image, an indication that the third image is available.

9. The system of claim 7, wherein the one or more computing devices are further configured to:
provide for display the indication in a first state when the third image has not been viewed by an operator; and
provide for display the indication in a second state, different from the first state, when the third image has been viewed by the operator.

10. The system of claim 7, wherein the one or more computing devices are further configured to provide for display, with the second image and the first image portion of the first image, a map including a first marker indicating a location where only one image is available for only one date and a second marker indicating a second location where a set of images is available for different dates.

11. The system of claim 7, wherein the one or more computing devices are further configured to:
provide for display the second marker in a first state when no images of the set of images have been viewed by an operator; and
provide for display the indication in a second state, different from the first state, when at least one image of the set of images has been viewed by the operator.

12. The system of claim 7, wherein the one or more computing devices are further configured to:
receive input confirming the area of the second image, and
perform the determining the area of the third image after the input confirming the area of the second image is received.

13. The system of claim 7, wherein the one or more computing devices are further configured to automatically modify image pixels corresponding to the area of the third image before providing the third image for display.

14. A non-transitory computer-readable storage medium on which computer readable instructions of a program are stored, the instructions, when executed by a processor, cause the processor to perform a method, the method comprising:
receive a request to blur an object in a first image, the request identifying at least a portion of the first image;
provide for display a second image and the portion of the first image, wherein the second image is associated with three dimensional geometry data corresponding to a surface of the object depicted in both the first image and the second image and with date information identifying when the second image was captured;
receive user input identifying an area of the second image;
identify a third image based on date information identifying when the third image was captured and the date information identifying when the second image was captured, the third image being associated with three dimensional geometry data corresponding to a surface of the object depicted in the third image;
provide for display with the second image and the portion of the first image, an indication that the third image is available;
determine an area of the third image based on the three dimensional geometry data associated with the third image, the three dimensional geometry data associated with the second image, and the area of the second image; and
provide information identifying the area of the third image for display with the third image;
receiving input confirming the area of the third image; and
blurring image pixels corresponding to the area of the third image.

15. The medium of claim 14, wherein the method further comprises providing for display, with the second image and the portion of the first image, a map including a first marker indicating a location where only one image is available for only one date and a second marker indicating a second location where a set of images is available for different dates.

16. The medium of claim 14, wherein the method further comprises:
receiving input confirming the area of the second image, and
wherein determining the area of the third image is performed after the input confirming the area of the second image is received.

* * * * *